United States Patent
Yu et al.

(10) Patent No.: US 11,010,086 B2
(45) Date of Patent: May 18, 2021

(54) DATA SYNCHRONIZATION METHOD AND OUT-OF-BAND MANAGEMENT DEVICE

(71) Applicant: Huawei Technologies Co., Ltd., Shenzhen (CN)

(72) Inventors: Fei Yu, Hangzhou (CN); Chaojun Jiang, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 228 days.

(21) Appl. No.: 16/185,735

(22) Filed: Nov. 9, 2018

(65) Prior Publication Data

US 2019/0079675 A1    Mar. 14, 2019

Related U.S. Application Data

(63) Continuation of application No. PCT/CN2017/087164, filed on Jun. 5, 2017.

(30) Foreign Application Priority Data

Oct. 25, 2016  (CN) .......................... 201610939285.4

(51) Int. Cl.
*G06F 12/00* (2006.01)
*G06F 13/00* (2006.01)
(Continued)

(52) U.S. Cl.
CPC .............. *G06F 3/065* (2013.01); *G06F 3/061* (2013.01); *G06F 3/0619* (2013.01);
(Continued)

(58) Field of Classification Search
CPC ............. G06F 11/2097; G06F 11/1658; G06F 11/1662; G06F 11/1675; G06F 11/2082
(Continued)

(56) References Cited

U.S. PATENT DOCUMENTS

2003/0014523 A1*  1/2003  Teloh .................. G06F 11/2082
                                                709/226
2005/0088969 A1   4/2005  Carlsen et al.
(Continued)

FOREIGN PATENT DOCUMENTS

CN            1592132 A       3/2005
CN          101038591 A       9/2007
(Continued)

OTHER PUBLICATIONS

Machine Translation and Abstract of Chinese Publication No. CN1592132, Mar. 9, 2005, 12 pages.
(Continued)

*Primary Examiner* — Charles Rones
*Assistant Examiner* — Sidney Li
(74) *Attorney, Agent, or Firm* — Conley Rose, P.C.

(57) ABSTRACT

A data synchronization method includes checking first to-be-checked information stored in an active area of a first board to obtain a first check result and second to-be-checked information stored in an active area of a second board to obtain a second check result before data synchronization, where the first board and the second board are include in an out-of-band management device, determining an active board and a standby board from the first board and the second board according to the first check result and the second check result, and synchronizing data in an active area of the active board to a standby area of the standby board. Hence, the method can be implemented to ensure validity of data synchronization.

20 Claims, 4 Drawing Sheets

(51) Int. Cl.
*G06F 13/28* (2006.01)
*G06F 3/06* (2006.01)
*H04L 12/24* (2006.01)
*G06F 11/16* (2006.01)
*G06F 11/20* (2006.01)

(52) U.S. Cl.
CPC .......... *G06F 3/0673* (2013.01); *G06F 3/0689* (2013.01); *H04L 41/04* (2013.01); *H04L 41/0896* (2013.01); *G06F 11/1658* (2013.01); *G06F 11/1662* (2013.01); *G06F 11/1675* (2013.01); *G06F 11/2082* (2013.01); *G06F 11/2097* (2013.01)

(58) Field of Classification Search
USPC ........................................................ 711/154
See application file for complete search history.

(56) References Cited

U.S. PATENT DOCUMENTS

| | | | |
|---|---|---|---|
| 2007/0239952 | A1 | 10/2007 | Hwang et al. |
| 2008/0056005 | A1* | 3/2008 | Aritome .............. G11C 11/5642 365/185.21 |
| 2012/0182900 | A1 | 7/2012 | Davari |
| 2012/0301134 | A1 | 11/2012 | Davari et al. |

FOREIGN PATENT DOCUMENTS

| | | |
|---|---|---|
| CN | 101132314 A | 2/2008 |
| CN | 101150430 A | 3/2008 |
| CN | 101262369 A | 9/2008 |
| CN | 103365746 A | 10/2013 |
| CN | 103488494 A | 1/2014 |
| CN | 104734887 A | 6/2015 |
| CN | 105488010 A | 4/2016 |
| CN | 106301967 A | 1/2017 |
| WO | 2007091237 A2 | 8/2007 |

OTHER PUBLICATIONS

Machine Translation and Abstract of Chinese Publication No. CN101038591, Sep. 19, 2007, 20 pages.
Machine Translation and Abstract of Chinese Publication No. CN101132314, Feb. 27, 2008, 17 pages.
Machine Translation and Abstract of Chinese Publication No. CN101150430, Mar. 26, 2008, 17 pages.
Machine Translation and Abstract of Chinese Publication No. CN101262369, Sep. 10, 2008, 20 pages.
Machine Translation and Abstract of Chinese Publication No. CN103365746, Oct. 23, 2013, 30 pages.
Machine Translation and Abstract of Chinese Publication No. CN104734887, Jun. 24, 2015, 13 pages.
Machine Translation and Abstract of Chinese Publication No. CN106301967, Jan. 4, 2017, 24 pages.
Foreign Communication From a Counterpart Application, Chinese Application No. 201610939285.4, Chinese Office Action dated Nov. 21, 2018, 6 pages.
Foreign Communication From a Counterpart Application, PCT Application No. PCT/CN2017/087164, English Translation of International Search Report dated Aug. 24, 2017, 2 pages.
Feng, Q., "Filling the Domestic Gap, Qixing Launches Out-of-Band Management Products," GNSS World; Industry Dynamics, DIGITCW, Jun. 2015, with an English machine translation, 3 pages.

* cited by examiner

DATA SYNCHRONIZATION METHOD AND OUT-OF-BAND MANAGEMENT DEVICE

CROSS-REFERENCE TO RELATED APPLICATION

This application is a continuation of International Patent Application No. PCT/CN2017/087164 filed on Jun. 5, 2017, which claims priority to Chinese Patent Application No. 201610939285.4 filed on Oct. 25, 2016. The disclosures of the aforementioned applications are hereby incorporated by reference in their entireties.

TECHNICAL FIELD

The present disclosure relates to the field of network communications technologies, and in particular, to a data synchronization method and an out-of-band management device.

BACKGROUND

Out-of-band management is a hardware-based management mode in which a management interface is provided using a dedicated hardware module or a special remote management card, and a device is remotely maintained and managed using a dedicated data channel.

In the server field, high-reliability, high-density, and high-performance servers that are transaction-oriented and computation-oriented are increasingly popular in some highly risky industries (such as a government, finance, electric power, petroleum, and operators). Because purchase and maintenance costs of this type of server are very high, higher requirements are imposed on reliability, maintainability, and availability of this type of server. Therefore, for this type of server, a redundancy design method is usually used in an out-of-band management layer such that when one set of systems are faulty, another set of systems may be started immediately to replace the faulty systems and implement normal running of services.

A redundancy design of an out-of-band management device for a server usually may use two completely same sets of hardware systems and software systems, where one set is used as an active device, and the other set is used as a standby device. The two sets of devices actually both run. The active device is in a work state, and the standby device is in a sleep state. To ensure consistency of system running, the software system of the active device synchronizes some key information (such as user management information and alarm information) to the standby device. In this way, when the system of the active device is faulty and the active device is changed to a standby device, the standby device may directly become an active device to implement seamless switching between the active device and the standby device, and replace the faulty system to continue running the services, without affecting any operation or configuration performed by a user.

As can be learned from the foregoing description, data synchronization between the active device and the standby device plays a core role in the redundancy design. It is found in practice that, in a process of data synchronization, some uncertain factors, for example, a misoperation of the user or sudden power-off, easily occur, and the uncertain factors cause data synchronization failure. Because data synchronization has a feature of replacement and overwriting, once the data synchronization fails, data can be hardly recovered. Consequently, a data loss is caused, and data synchronization is invalid.

SUMMARY

Embodiments of the present disclosure provide a data synchronization method and an out-of-band management device to ensure validity of data synchronization.

A first aspect of the embodiments of the present disclosure discloses a data synchronization method, applied to an out-of-band management device, where the out-of-band management device includes a first board and a second board, and the method includes checking, before data synchronization, first to-be-checked information stored in an active area of the first board to obtain a first check result and second to-be-checked information stored in an active area of the second board to obtain a second check result, determining an active board and a standby board from the first board and the second board according to the first check result and the second check result, and synchronizing data in an active area of the active board to a standby area of the standby board, where the data in the active area of the active board is valid data.

The first to-be-checked information may include a check code and a server identity, and the second to-be-checked information may include a check code and a server identity. The check code may be generated using any one of check algorithms such as CRC32, MD5, and SHA1, and the check code is generally used to check integrity of a file. The server identity is used to uniquely identify an identity of a server, for example, a serial number, a one-dimensional code, or a two-dimensional code of the server. The server identity is used to check whether the server identity matches the server.

Obviously, in the embodiments of the present disclosure, regardless of whether there is impact caused by an unstable factor such as a human factor or an environmental factor, the out-of-band management device can redetermine the active board and the standby board by checking the to-be-checked information on the two boards to ensure that the to-be-synchronized data on the active board is valid data such that validity of data synchronization can be ensured.

In a possible implementation, determining an active board and a standby board from the first board and the second board according to the first check result and the second check result includes determining the first board as the active board and the second board as the standby board when the first check result indicates that the first to-be-checked information is checked successfully and the second check result indicates that the second to-be-checked information fails to be checked, determining the second board as the active board and the first board as the standby board when the first check result indicates that the first to-be-checked information fails to be checked and the second check result indicates that the second to-be-checked information is checked successfully, comparing first to-be-compared information in the active area of the first board with second to-be-compared information in the active area of the second board to obtain a comparison result when both the first check result and the second check result indicate that the check succeeds, determining the first board as the active board and the second board as the standby board if the comparison result indicates that data stored on the first board is latest data, or determining the second board as the active board and the first board as the standby board if the comparison result indicates that data stored on the second board is latest data.

In this optional implementation, if the first check result and the second check result are different, a board that is checked successfully may be determined as the active board, and a board that fails to be checked may be determined as the standby board. In this way, it can be determined that a complete file exists on the active board and that the active board belongs to the current server, or if both the first check result and the second check result indicate that the check succeeds, determining may be further performed according to the comparison result, a board that stores latest data is determined as the active board, and the other is determined as the standby board. In this way, it can be ensured that the to-be-synchronized data is valid latest data.

In a possible implementation, determining an active board and a standby board from the first board and the second board according to the first check result and the second check result includes outputting the first check result and the second check result when the first check result and the second check result are different, receiving a selection instruction input for the first board and the second board according to the first check result and the second check result, and determining a selected board as the active board, and determining an unselected board as the standby board, or comparing first to-be-compared information in the active area of the first board with second to-be-compared information in the active area of the second board to obtain a comparison result when the first check result and the second check result are consistent, outputting the comparison result if the comparison result indicates that the first to-be-compared information and the second to-be-compared information are different, receiving a selection instruction input for the first board and the second board according to the comparison result, and determining a selected board as the active board, and determining an unselected board as the standby board.

In this optional implementation, if the first check result and the second check result are different, or the comparison result indicates a difference, the difference may be presented to a user. This helps the user determine data validity according to an actual situation and further determine which board is used as the active board and which board is used as the standby board.

In a possible implementation, when the data in the active area of the active board is synchronized successfully, the method further includes changing the standby area of the standby board to an active area, and changing an active area of the standby board to a standby area.

In this optional implementation, when data synchronization succeeds, data in the standby area of the current standby board is latest data, but data in the active area of the current standby board is earlier data. To ensure that the data in the active area of the standby board is always later than the data in the standby area of the standby board, the standby area of the current standby board needs to be changed to an active area, and the active area of the current standby board needs to be changed to a standby area.

In a possible implementation, the method further includes outputting, on the board whose data is damaged, alarm information for prompting that the data is damaged when data on one of the first board and the second board is damaged.

Due to impact caused by an unstable factor such as a human factor or an environmental factor, data on a board may be damaged. After the out-of-band management device outputs, on the board whose data is damaged, the alarm information for prompting that the data is damaged, the user may review whether the data is lost, and if the data is not lost, the user may manually synchronize the data in the active area to the standby area to clear the alarm information, or if the data is lost, the user may take a corresponding measure. For example, when the active board is removed mistakenly but a new board is inserted, the user may remove the new board and insert the original active board. In this way, the data can be recovered.

In a possible implementation, for either of the first board and the second board, data stored in the active area of the board and data stored in a standby area of the board are data stored last two times, the data in the active area of the board is later than the data in the standby area of the board, and the data in the active area of the board is independent of the data in the standby area of the board.

A second aspect of the embodiments of the present disclosure discloses an out-of-band management device, including functional units configured to perform some or all steps of any method in the first aspect of the embodiments of the present disclosure. Validity of data synchronization can be ensured when the out-of-band management device performs some or all steps of any method in the first aspect.

A third aspect of the embodiments of the present disclosure discloses an out-of-band management device, including a processor, an output apparatus, a first board, a second board, and a memory, where the memory is configured to store an instruction, the processor is configured to run the instruction, and the processor runs the instruction to perform some or all steps of any method in the first aspect of the embodiments of the present disclosure. Validity of data synchronization can be ensured when the out-of-band management device performs some or all steps of any method in the first aspect.

A fourth aspect of the embodiments of the present disclosure discloses a computer storage medium, where the computer storage medium stores a program, and the program further includes an instruction used to perform some or all steps of any method in the first aspect of the embodiments of the present disclosure.

In some possible implementations, if the first check result and the second check result are consistent, and the comparison result indicates that data stored on the first board and data stored on the second board are consistent, the out-of-band management device may further check hardware statuses of the first board and the second board separately, and if the hardware status of the first board indicates that there is a hardware fault on the first board and the hardware status of the second board indicates that there is no hardware fault on the second board, the second board may be determined as the active board, and the first board may be determined as the standby board, otherwise, if the hardware status of the first board indicates that there is no hardware fault on the first board and the hardware status of the second board indicates that there is a hardware fault on the second board, the first board may be determined as the active board, and the second board may be determined as the standby board. If there is no hardware fault on the first board and there is no hardware fault on the second board, either of the first board and the second board may be determined as the active board.

BRIEF DESCRIPTION OF DRAWINGS

To describe the technical solutions in some of the embodiments of the present disclosure more clearly, the following briefly describes the accompanying drawings describing some of the embodiments. The accompanying drawings in the following description show merely some embodiments of the present disclosure, and a person of ordinary skill in the art may derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure shall fall within the protection scope of the present disclosure.

The terms "including," "having," or any other variant thereof mentioned in the specification, claims, and the accompanying drawings of the present disclosure, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The embodiments of the present disclosure disclose a data synchronization method and an out-of-band management device to ensure validity of data synchronization. Detailed descriptions are hereinafter provided separately.

For better understanding the embodiments of the present disclosure, the following first describes a schematic diagram of a network architecture disclosed by an embodiment of the present disclosure.

Figure 1A:
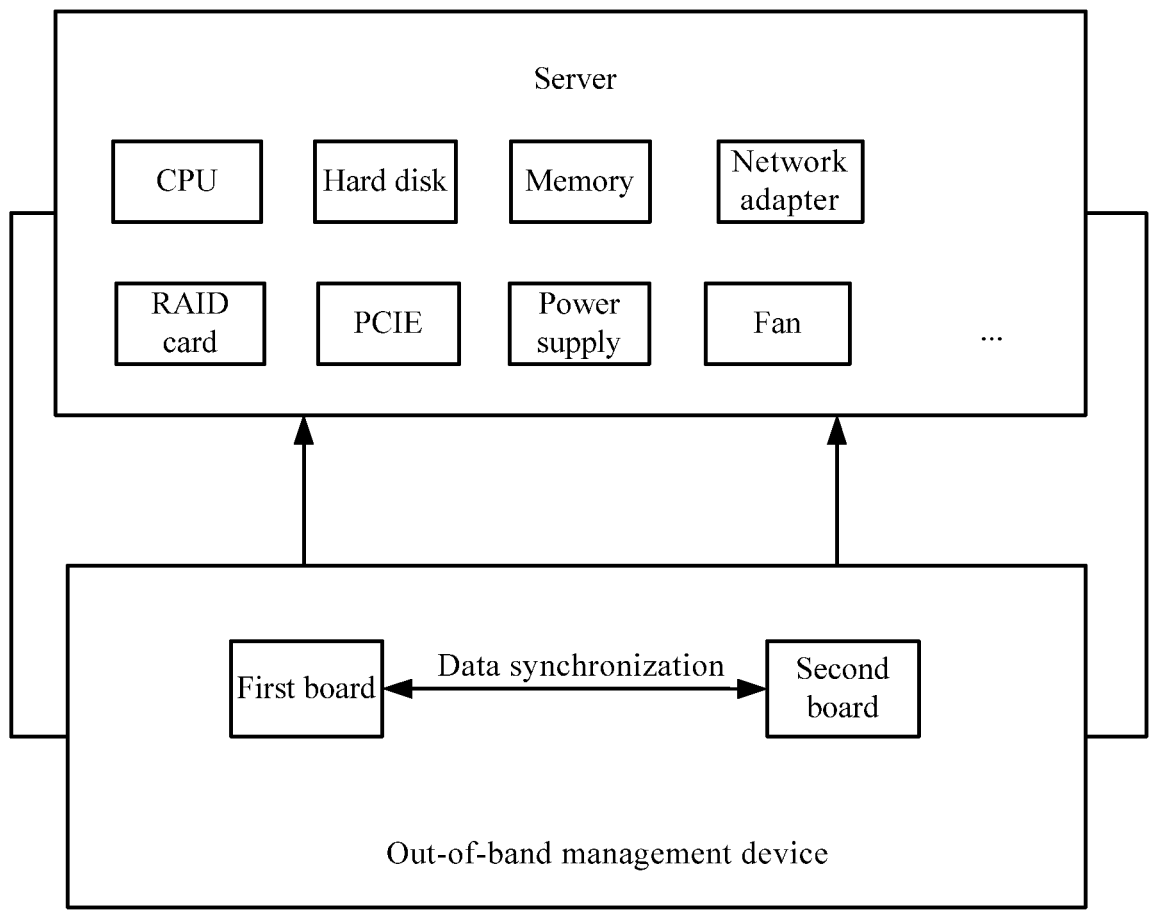
FIG. 1A is a schematic diagram of a network architecture according to an embodiment of the present disclosure.

Referring to FIG. 1A, FIG. 1A is a schematic diagram of a network architecture according to an embodiment of the present disclosure. As shown in FIG. 1A, the network architecture includes a server and an out-of-band management device.

The server shown in FIG. 1A is a high-density and high-performance server used in a critical department such as a government, finance, banking, petroleum, or electric power, and has higher requirements on system reliability and maintainability than a common server. Therefore, for this type of server, a redundancy design method is generally used in an out-of-band management layer such that when one set of systems is faulty, another set of systems may be started immediately to replace the faulty systems and implement normal running of services.

The server includes a plurality of hardware components, for example, a central processing unit (CPU), a hard disk, a memory, a network adapter, a Redundant Arrays of Independent Disks/disk array (RAID) card, a Peripheral Component Interconnect Express (PCIE), a power supply, a fan, and the like.

The out-of-band management device shown in FIG. 1A is mainly configured to manage hardware resources on the server, for example, the CPU, the memory, the hard disk, the network adapter, and an input/output device. The out-of-band management device monitors work states of the hardware resources, and generates a health event in real time such that a user detects a work state of the server in time.

The out-of-band management device mainly includes a first board and a second board. The first board and the second board have completely same hardware systems and software systems. Both the first board and the second board run, and a difference lies in that one of the first board and the second board is used as an active board, and the other is used as a standby board. The active board is usually in a work state, and the standby board is usually in a sleep state. To ensure consistency of system running, the active board may synchronize some key data (such as user management information and alarm information) to the standby board. In this way, it can be ensured that when the active board is faulty, the standby board may become an active board to implement seamless switching between the active board and the standby board, without affecting any operation or configuration performed by the user.

Figure 1B:
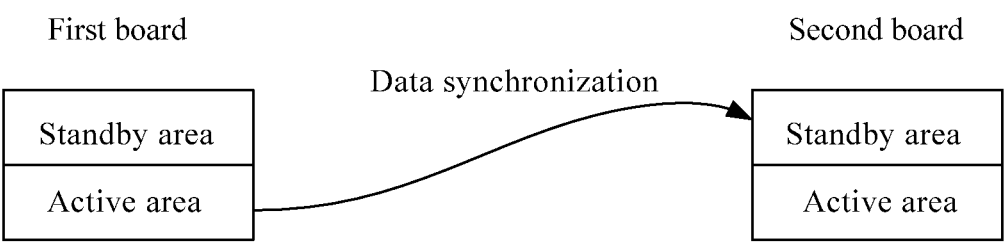
FIG. 1B is a schematic diagram of data synchronization according to an embodiment of the present disclosure.
Figure 1C:
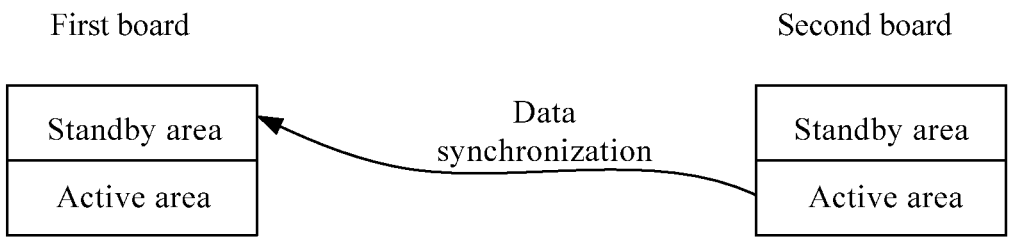
FIG. 1C is another schematic diagram of data synchronization according to an embodiment of the present disclosure.

Referring to FIG. 1B and FIG. 1C, FIG. 1B is a schematic diagram of data synchronization according to an embodiment of the present disclosure, and FIG. 1C is another schematic diagram of data synchronization according to an embodiment of the present disclosure. As shown in FIG. 1B or FIG. 1C, the first board includes an active area and a standby area, and the second board includes an active area and a standby area. Both the active area and the standby area on either of the boards are used to store data. For a same board, data stored in the active area and data stored in the standby area are data stored last two times, data in the active area is later than data in the standby area, and the data in the active area and the data in the standby area are mutually independent and do not affect each other. It should be noted that, when the data in the standby area is damaged, it may also be considered that the data in the standby area is earlier than the data in the active area. In addition, in the active area or the standby area, information such as a check code, a server identity, a timestamp, or a quantity of synchronization times may be stored.

In FIG. 1B, the first board is used as the active board, and the second board is used as the standby board, during data synchronization, data in the active area of the first board is synchronized to the standby area of the second board. In FIG. 1C, the second board is used as the active board, and the first board is used as the standby board, during data synchronization, data in the active area of the second board is synchronized to the standby area of the first board.

During running, the first board and the second board may encounter a plurality of unstable factors, for example, a misoperation of the user or an environmental factor. For example, during data synchronization, the user performs a misoperation of removing the active board. For another example, during data synchronization, the out-of-band management device is powered off suddenly. For another example, the user removes the active board when the out-of-band management device is powered off, and inserts a board when the out-of-band management device is powered on again. In the scenarios, a data loss may be caused, and data synchronization is invalid.

Based on the foregoing network architecture, this embodiment of the present disclosure can be implemented to ensure validity of data synchronization. In addition, when data is lost, the data can be recovered quickly.

Figure 2:
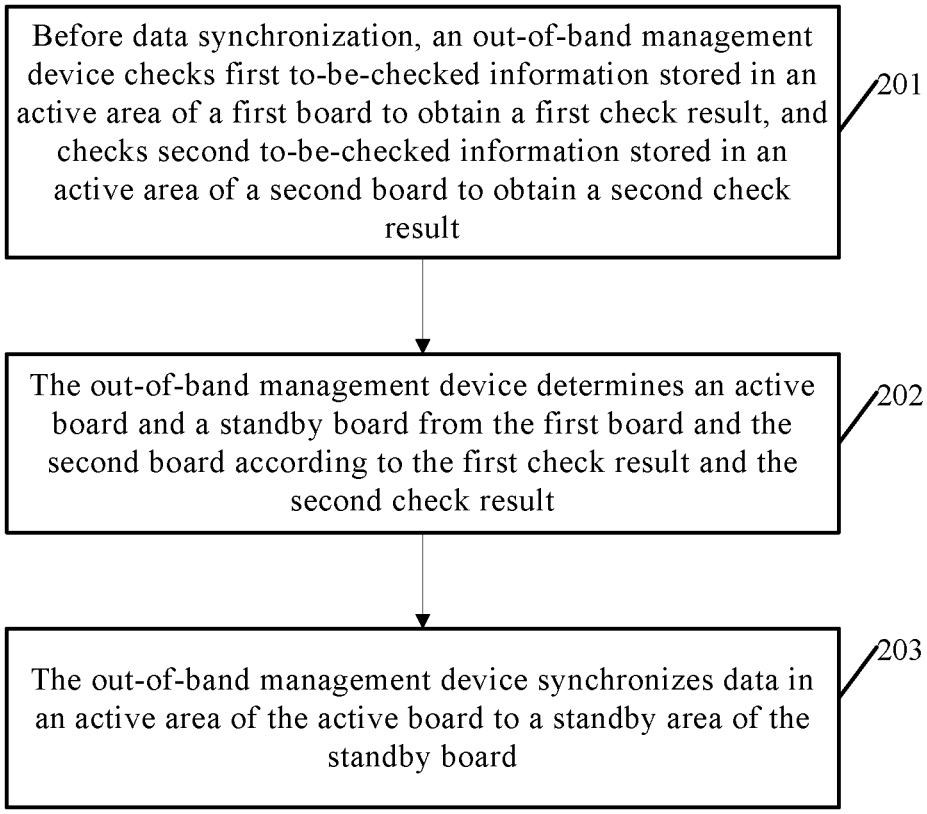
FIG. 2 is a schematic flowchart of a data synchronization method according to an embodiment of the present disclosure.

Referring to FIG. 2, FIG. 2 is a schematic flowchart of a data synchronization method according to an embodiment of the present disclosure. As shown in FIG. 2, the method may include the following steps.

Step 201. Before data synchronization, an out-of-band management device checks first to-be-checked information stored in an active area of a first board to obtain a first check result, and checks second to-be-checked information stored in an active area of a second board to obtain a second check result.

Before data synchronization, there is a plurality of scenarios. For example, a first scenario includes that when the first board and the second board are performing data synchronization, a user performs a misoperation of removing either of the first board and the second board, and then inserts a board. In this scenario, if the removed board is an active board, and the inserted board is still the original active board, data is not affected, if the removed board is an active board, and the inserted board is a new board, data synchronization fails, and data in a standby area of a standby board is damaged, and therefore, the data may be lost, or if the removed board is a standby board, regardless of whether the inserted board is the original standby board or a new board, data is not affected. A second scenario includes that when the first board and the second board are performing data synchronization, the out-of-band management device is powered off suddenly. In this case, data synchronization fails, and data in a standby area of a standby board is damaged, and after the out-of-band management device is powered on again, the standby board whose data is damaged may become an active board, and consequently normal data on the other board is overwritten, resulting in a data loss. A third scenario includes that the user removes an active board when the out-of-band management device is powered off, and inserts a board when the out-of-band management device is powered on again. In this scenario, if the inserted board is a new board, the inserted new blank board may become an active board, and consequently normal data on the other board is overwritten, resulting in a data loss, or if the inserted board is the original board, there is no impact.

It should be noted that, this embodiment of the present disclosure is not limited to the foregoing illustrated three scenarios, and may further include other scenarios, for example, a scenario in which data synchronization is normal.

Regardless of the scenarios, in order to avoid a data loss caused by data synchronization failure, in this embodiment of the present disclosure, before data synchronization, the out-of-band management device may check the first to-be-checked information stored in the active area of the first board to obtain the first check result, and check the second to-be-checked information stored in the active area of the second board to obtain the second check result. The first to-be-checked information includes but is not limited to a check code and a server identity. The second to-be-checked information includes but is not limited to a check code and a server identity. For the check code, whether a stored check code and a generated check code are consistent may be checked, and if they are consistent, it is determined that a file on the board is complete, or if they are inconsistent, it is determined that a file on the board is incomplete. The check code may be generated using any one of check algorithms such as CRC32, MD5, and SHA1, and the check code is generally used to check integrity of the file. For the server identity, whether the server identity matches the current server may be checked, and if they match, it indicates that a board storing the server identity belongs to the current server, or if they do not match, it indicates that a board storing the server identity belongs to another server. The server identity is used to uniquely identify an identity of a server, for example, a serial number, a one-dimensional code, or a two-dimensional code of the server. The server identity is used to check whether the server identity matches the server.

If the first to-be-checked information includes the check code and the server identity, when it is checked that the stored check code and the generated check code are consistent, and it is checked that the server identity matches the current server, it is determined that the first to-be-checked information is checked successfully, and it indicates that a valid complete file exists on the first board, otherwise, it is determined that the first to-be-checked information fails to be checked, and it indicates that no valid complete file exists on the first board. Likewise, the second to-be-checked information is similar to this, and is not further described herein.

It should be noted that, a standby area of the first board and a standby area of the second board also store to-be-checked information. The out-of-band management device also needs to check the to-be-checked information stored in the standby area of the first board and the to-be-checked information stored in the standby area of the second board. If the to-be-checked information in the standby area of the first board fails to be checked, alarm information for prompting check failure is output on the first board, or if the to-be-checked information in the standby area of the second board fails to be checked, alarm information for prompting check failure is output on the second board.

Step 202. The out-of-band management device determines an active board and a standby board from the first board and the second board according to the first check result and the second check result.

In this embodiment of the present disclosure, the first check result includes two types, the first to-be-checked information is checked successfully and the first to-be-checked information fails to be checked, and the second check result includes two types, the second to-be-checked information is checked successfully and the second to-be-checked information fails to be checked. Therefore, there are four scenarios. The first to-be-checked information is checked successfully and the second to-be-checked information is checked successfully, the first to-be-checked information is checked successfully and the second to-be-checked information fails to be checked, the first to-be-checked information fails to be checked and the second to-be-checked information is checked successfully, and the first to-be-checked information fails to be checked and the second to-be-checked information fails to be checked. The scenario in which the first to-be-checked information fails to be checked and the second to-be-checked information fails to be checked is not considered in this embodiment of the present disclosure.

In an optional embodiment, a manner of determining the active board and the standby board from the first board and the second board by the out-of-band management device according to the first check result and the second check result may be when the first check result indicates that the first to-be-checked information is checked successfully and the second check result indicates that the second to-be-checked information fails to be checked, determining the first board as the active board and the second board as the standby board, or when the first check result indicates that the first to-be-checked information fails to be checked and the second check result indicates that the second to-be-checked information is checked successfully, determining the second board as the active board and the first board as the standby board, or when both the first check result and the second check result indicate that the check succeeds, comparing first to-be-compared information in the active area of the first board with second to-be-compared information in the active area of the second board to obtain a comparison result, and if the comparison result indicates that data stored on the first board is latest data, determining the first board as the active board and the second board as the standby board, or if the comparison result indicates that data stored on the second board is latest data, determining the second board as the active board and the first board as the standby board.

In this optional implementation, if the first check result and the second check result are different, a board that is checked successfully may be determined as the active board, and a board that fails to be checked may be determined as the standby board. In this way, it can be determined that a complete file exists on the active board and that the active board belongs to the current server.

If both the first check result and the second check result indicate that the check succeeds, further, the first to-be-compared information in the active area of the first board and the second to-be-compared information in the active area of the second board need to be compared, and the comparison result is obtained. The first to-be-compared information may include but is not limited to a timestamp, a quantity of synchronization times, an operation log record, and user configuration information. The second to-be-compared information may include but is not limited to a timestamp, a quantity of synchronization times, an operation log record, and user configuration information. The timestamp is used to identify an update time of stored data, and the quantity of synchronization times is a quantity of times of performing data synchronization between the active board and the standby board. Optionally, data on which board is the latest data may be determined according to the timestamp and the quantity of synchronization times.

If the comparison result indicates that the data stored on the first board is the latest data, the first board may be determined as the active board and the second board may be determined as the standby board, or if the comparison result indicates that the data stored on the second board is the latest data, the second board is determined as the active board and the first board is determined as the standby board.

In another optional embodiment, if the first check result and the second check result are consistent, and the comparison result indicates that the data stored on the first board and the data stored on the second board are consistent, the out-of-band management device may further check hardware statuses of the first board and the second board separately, and if the hardware status of the first board indicates that there is a hardware fault on the first board and the hardware status of the second board indicates that there is no hardware fault on the second board, the second board may be determined as the active board, and the first board may be determined as the standby board, otherwise, if the hardware status of the first board indicates that there is no hardware fault on the first board and the hardware status of the second board indicates that there is a hardware fault on the second board, the first board may be determined as the active board, and the second board may be determined as the standby board. If there is no hardware fault on the first board and there is no hardware fault on the second board, either of the first board and the second board may be determined as the active board.

In another optional embodiment, a manner of determining the active board and the standby board from the first board and the second board by the out-of-band management device according to the first check result and the second check result may be when the first check result and the second check result are different, outputting the first check result and the second check result, receiving a selection instruction input for the first board and the second board according to the first check result and the second check result, and determining a selected board as the active board, and determining an unselected board as the standby board, or when the first check result and the second check result are consistent, comparing first to-be-compared information in the active area of the first board with second to-be-compared information in the active area of the second board to obtain a comparison result, if the comparison result indicates that the first to-be-compared information and the second to-be-compared information are different, outputting the comparison result, receiving a selection instruction input for the first board and the second board according to the comparison result, and determining a selected board as the active board, and determining an unselected board as the standby board.

In this optional implementation, if the first check result and the second check result are different, the first check result and the second check result are output, and the difference is presented to the user, allowing the user to select and determine a board as the active board and a board as the standby board, or if the first check result and the second check result are consistent (that is, both the first check result and the second check result indicate that the check succeeds), further, the first to-be-compared information in the active area of the first board and the second to-be-compared information in the active area of the second board need to be compared, and the comparison result is obtained, and if the comparison result indicates that the first to-be-compared information and the second to-be-compared information are different, the comparison result is output and presented to the user, allowing the user to select and determine a board as the active board and a board as the standby board. This helps the user determine data validity according to an actual situation and further determine the active and standby boards.

In another optional implementation, the method may further include the following step of outputting, on the board whose data is damaged, alarm information for prompting that the data is damaged when data on one of the first board and the second board is damaged.

In this optional implementation, if data on one of the first board and the second board is damaged, it indicates that incomplete data exists on the board whose data is damaged. This case is generally caused by an unstable factor such as a human factor or an environmental factor. In this case, alarm information for prompting that the data is damaged may be output on the board whose data is damaged. After viewing the alarm information, the user may review whether the data is lost, and if the data is not lost, the user may manually synchronize the data in the active area to the standby area to clear the alarm information, or if the data is lost, the user may take a corresponding measure. For example, when the active board is removed mistakenly but a new board is inserted, the user may remove the new board and insert the original active board. In this way, the data can be recovered.

Step 203. The out-of-band management device synchronizes data in an active area of the active board to a standby area of the standby board.

During data synchronization, the out-of-band management device always synchronizes the data in the active area of the active board to the standby area of the standby board.

In another optional implementation, the method may further include the following step of changing the standby area of the standby board to an active area, and changing an active area of the standby board to a standby area when the data in the active area of the active board is synchronized successfully.

For either of the first board and the second board, data stored in the active area of the board and data stored in the standby area of the board are data stored last two times, the data in the active area of the board is later than the data in the standby area of the board, and the data in the active area of the board and the data in the standby area of the board are mutually independent and do not affect each other.

In this optional implementation, when data synchronization succeeds, data in the standby area of the current standby board is latest data, but data in the active area of the current standby board is earlier data. To ensure that the data in the active area of the standby board is always later than the data in the standby area of the standby board, the standby area of the current standby board needs to be changed to an active area, and the active area of the current standby board needs to be changed to a standby area.

In the method procedure described in FIG. 2, before data synchronization, the out-of-band management device may check the first to-be-checked information stored in the active area of the first board to obtain the first check result, and check the second to-be-checked information stored in the active area of the second board to obtain the second check result, and further, the out-of-band management device may determine the active board and the standby board from the first board and the second board according to the first check result and the second check result. In this way, the out-of-band management device may synchronize the data in the active area of the active board to the standby area of the standby board. Obviously, in this embodiment of the present disclosure, regardless of whether there is impact caused by an unstable factor such as a human factor or an environmental factor, the out-of-band management device can redetermine the active board and the standby board by checking the to-be-checked information on the two boards, to ensure that the to-be-synchronized data on the active board is valid data such that validity of data synchronization can be ensured.

Figure 3:
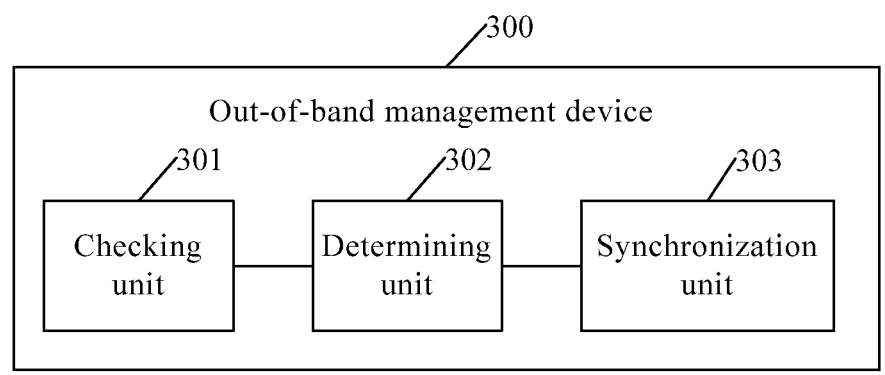
FIG. 3 is a schematic structural diagram of an out-of-band management device according to an embodiment of the present disclosure.

Referring to FIG. 3, FIG. 3 is a schematic structural diagram of an out-of-band management device 300 according to an embodiment of the present disclosure. The out-of-band management device 300 is configured to perform the data synchronization method described in FIG. 2. For details, refer to related descriptions in FIG. 2. Details are not further described herein. As shown in FIG. 3, the out-of-band management device 300 includes a checking unit 301 configured to check, before data synchronization, first to-be-checked information stored in an active area of a first board of the out-of-band management device 300 to obtain a first check result and second to-be-checked information stored in an active area of a second board of the out-of-band management device 300 to obtain a second check result, a determining unit 302 configured to determine an active board and a standby board from the first board and the second board according to the first check result and the second check result, and a synchronization unit 303 configured to synchronize data in an active area of the active board to a standby area of the standby board, where the data in the active area of the active board is valid data.

Optionally, a manner of determining the active board and the standby board from the first board and the second board by the determining unit 302 according to the first check result and the second check result includes that when the first check result indicates that the first to-be-checked information is checked successfully and the second check result indicates that the second to-be-checked information fails to be checked, determining the first board as the active board and the second board as the standby board, or when the first check result indicates that the first to-be-checked information fails to be checked and the second check result indicates that the second to-be-checked information is checked successfully, determining the second board as the active board and the first board as the standby board, or when both the first check result and the second check result indicate that the check succeeds, comparing first to-be-compared information in the active area of the first board with second to-be-compared information in the active area of the second board to obtain a comparison result, and if the comparison result indicates that data stored on the first board is latest data, determining the first board as the active board and the second board as the standby board, or if the comparison result indicates that data stored on the second board is latest data, determining the second board as the active board and the first board as the standby board.

Optionally, a manner of determining the active board and the standby board from the first board and the second board by the determining unit 302 according to the first check result and the second check result includes that when the first check result and the second check result are different, outputting the first check result and the second check result, receiving a selection instruction input for the first board and the second board according to the first check result and the second check result, and determining a selected board as the active board, and determining an unselected board as the standby board, or when the first check result and the second check result are consistent, comparing first to-be-compared information in the active area of the first board with second to-be-compared information in the active area of the second board to obtain a comparison result, if the comparison result indicates that the first to-be-compared information and the second to-be-compared information are different, outputting the comparison result, receiving a selection instruction input for the first board and the second board according to the comparison result, and determining a selected board as the active board, and determining an unselected board as the standby board.

For either of the first board and the second board, data stored in the active area of the board and data stored in a standby area of the board are data stored last two times, the data in the active area of the board is later than the data in the standby area of the board, and the data in the active area of the board is independent of the data in the standby area of the board.

Figure 4:
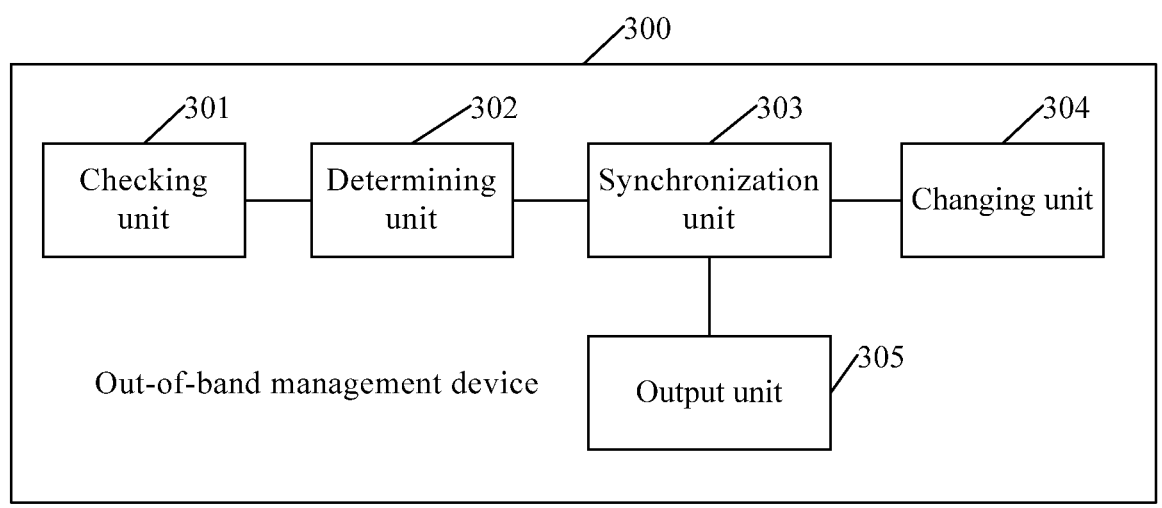
FIG. 4 is a schematic structural diagram of another out-of-band management device according to an embodiment of the present disclosure.

Referring to FIG. 4, FIG. 4 is a schematic structural diagram of another out-of-band management device 300 according to an embodiment of the present disclosure. The out-of-band management device 300 is configured to perform the data synchronization method described in FIG. 2. For details, refer to related descriptions in FIG. 2. Details are not further described herein. The out-of-band management device 300 shown in FIG. 4 is obtained on a basis of further optimizing the out-of-band management device 300 shown in FIG. 3. In comparison with the out-of-band management device 300 shown in FIG. 3, in addition to all the units of the out-of-band management device 300 shown in FIG. 3, the out-of-band management device 300 shown in FIG. 4 may further include a changing unit 304 configured to change the standby area of the standby board to an active area, and change an active area of the standby board to a standby area when the data in the active area of the active board is synchronized successfully.

Optionally, the out-of-band management device 300 shown in FIG. 4 may further include an output unit 305 configured to output, on the board whose data is damaged, alarm information for prompting that the data is damaged when data on one of the first board and the second board is damaged.

In the out-of-band management device 300 described in FIG. 3 and FIG. 4, regardless of whether there is impact caused by an unstable factor such as a human factor or an environmental factor, the out-of-band management device 300 can redetermine the active board and the standby board by checking the to-be-checked information on the two boards to ensure that the to-be-synchronized data on the active board is valid data such that validity of data synchronization can be ensured.

Figure 5:
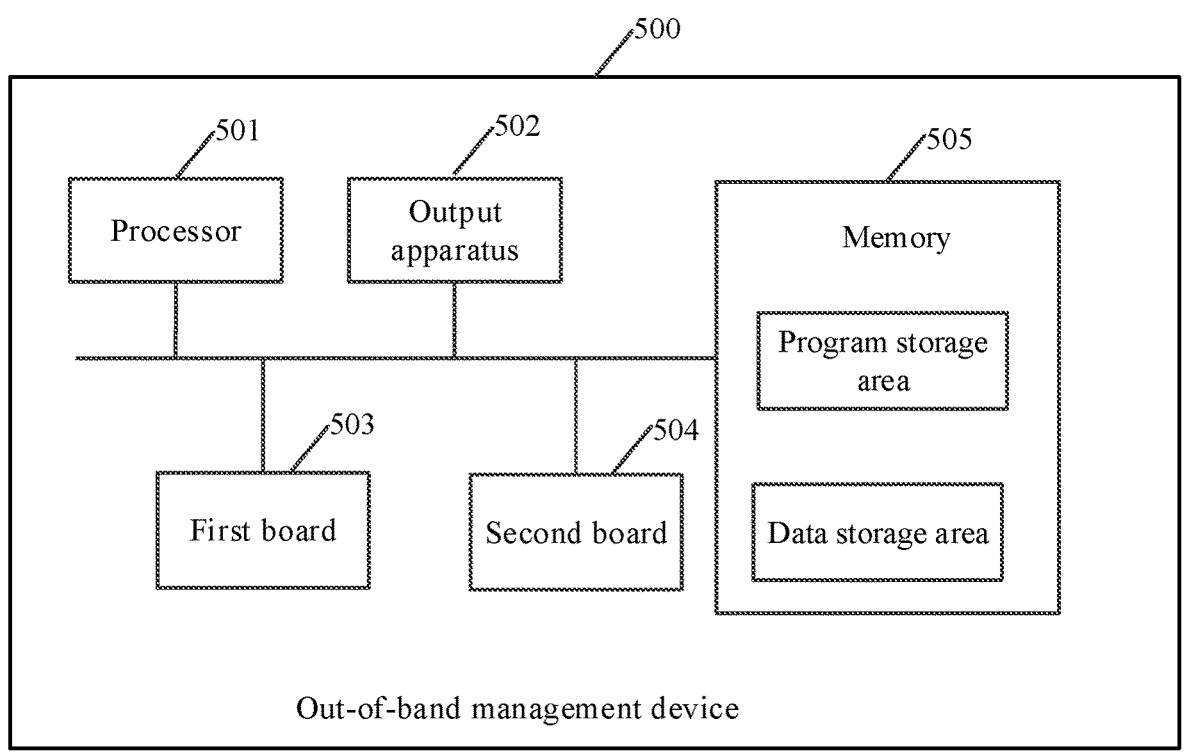
FIG. 5 is a schematic structural diagram of another out-of-band management device according to an embodiment of the present disclosure.

Referring to FIG. 5, FIG. 5 is a schematic structural diagram of another out-of-band management device 500 according to an embodiment of the present disclosure. The out-of-band management device 500 is configured to perform the data synchronization method described in FIG. 2. For details, refer to related descriptions in FIG. 2. Details are not further described herein. The out-of-band management device 500 may include at least one processor 501, at least one output apparatus 502, a first board 503, a second board 504, and a memory 505.

The memory 505 may be a high-speed random access memory (RAM), or may be a non-volatile memory. A person skilled in the art may understand that, the structure of the out-of-band management device 500 shown in FIG. 5 does not constitute a limitation on the present disclosure. The structure may be a bus structure, or may be a star structure, or may further include more or fewer parts than that shown in FIG. 5, or some parts are combined, or arrangements of parts are different.

The processor 501 is a control center of the out-of-band management device 500, and may be a CPU. The processor 501 is connected to various parts of the whole out-of-band management device 500 using various interfaces and lines, and configured to perform the following operations by running or executing a software program and/or module stored in the memory 505 and invoking program code stored in the memory 505 before data synchronization. The operations include checking first to-be-checked information stored in an active area of the first board to obtain a first check result, and checking second to-be-checked information stored in an active area of the second board to obtain a second check result, determining an active board and a standby board from the first board and the second board according to the first check result and the second check result, and synchronizing data in an active area of the active board to a standby area of the standby board, where the data in the active area of the active board is valid data.

Optionally, determining an active board and a standby board from the first board and the second board by the processor 501 according to the first check result and the second check result includes, when the first check result indicates that the first to-be-checked information is checked successfully and the second check result indicates that the second to-be-checked information fails to be checked, determining the first board as the active board and the second board as the standby board, when the first check result indicates that the first to-be-checked information fails to be checked and the second check result indicates that the second to-be-checked information is checked successfully, determining the second board as the active board and the first board as the standby board, when both the first check result and the second check result indicate that the check succeeds, comparing first to-be-compared information in the active area of the first board with second to-be-compared information in the active area of the second board to obtain a comparison result, if the comparison result indicates that data stored on the first board is latest data, determining the first board as the active board and the second board as the standby board, or if the comparison result indicates that data stored on the second board is latest data, determining the second board as the active board and the first board as the standby board.

Optionally, determining an active board and a standby board from the first board and the second board by the processor 501 according to the first check result and the second check result includes, when the first check result and the second check result are different, outputting the first check result and the second check result, receiving a selection instruction input for the first board and the second board according to the first check result and the second check result, and determining a selected board as the active board, and determining an unselected board as the standby board, or when the first check result and the second check result are consistent, comparing first to-be-compared information in the active area of the first board with second to-be-compared information in the active area of the second board to obtain a comparison result, if the comparison result indicates that the first to-be-compared information and the second to-be-compared information are different, outputting the comparison result, receiving a selection instruction input for the first board and the second board according to the comparison result, and determining a selected board as the active board, and determining an unselected board as the standby board.

Optionally, by invoking the program code stored in the memory 505, the processor 501 is further configured to perform the following operations when the data in the active area of the active board is synchronized successfully, changing the standby area of the standby board to an active area, and changing an active area of the standby board to a standby area.

Optionally, by invoking the program code stored in the memory 505, the processor 501 is further configured to perform the following operation when data on one of the first board and the second board is damaged, outputting, on the board whose data is damaged, alarm information for prompting that the data is damaged.

For either of the first board and the second board, data stored in the active area of the board and data stored in a standby area of the board are data stored last two times, the data in the active area of the board is later than the data in the standby area of the board, and the data in the active area of the board is independent of the data in the standby area of the board.

In the out-of-band management device 500 described in FIG. 5, regardless of whether there is impact caused by an unstable factor such as a human factor or an environmental factor, the out-of-band management device can redetermine the active board and the standby board by checking the to-be-checked information on the two boards, to ensure that the to-be-synchronized data on the active board is valid data such that validity of data synchronization can be ensured.

It should be noted that, to make the description brief, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are example embodiments, and the related actions and modules are not necessarily mandatory to the present disclosure.

In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage. Based on such an understanding, the technical solutions of the present disclosure essentially, or the part contributing to other approaches, or all or a part of the technical solutions may be implemented in the form of a software product. The software product is stored in a storage and includes several instructions for instructing a computer device (which may be a personal computer, a server, a network device, or the like) to perform all or a part of the steps of the methods described in the embodiments of the present disclosure. The foregoing storage includes any medium that can store program code, such as a universal serial bus (USB) flash drive, a read-only memory (ROM), a RAM, a removable hard disk, a magnetic disk, or an optical disc.

A person of ordinary skill in the art may understand that all or some of the steps of the methods in the embodiments may be implemented by a program instructing relevant hardware. The program may be stored in a computer readable storage. The storage may include a flash memory, a ROM, a RAM, a magnetic disk, and an optical disc.

The embodiments of the present disclosure are described in detail above. The principle and implementation of the present disclosure are described herein through specific examples. The description about the embodiments of the present disclosure is merely provided to help understand the method and core ideas of the present disclosure. In addition, a person of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. A data synchronization method, comprising:
   checking, before data synchronization, first to-be-checked information stored in a first active area of a first board in an out-of-band management device to obtain a first check result, wherein the first board comprises the first active area and a first standby area, and wherein the first active area stores more recent data than the first standby area;
   checking, before data synchronization, second to-be-checked information stored in a second active area of a second board in the out-of-band management device to obtain a second check result, wherein the second board comprises the second active area and a second standby area, and wherein the second active area stores more recent data than the second standby area;
   determining an active board and a standby board from the first board and the second board according to the first check result and the second check result; and
   synchronizing data in an active area of the active board to a standby area of the standby board, wherein the data in the active area of the active board comprises valid data.

2. The method of claim 1, wherein determining the active board and the standby board comprises:
   determining the first board as the active board and the second board as the standby board when the first check result indicates that the first to-be-checked information is checked successfully and the second check result indicates that the second to-be-checked information fails to be checked;
   determining the second board as the active board and the first board as the standby board when the first check result indicates that the first to-be-checked information fails to be checked and the second check result indicates that the second to-be-checked information is checked successfully;
   comparing first to-be-compared information in the first active area of the first board with second to-be-compared information in the second active area of the second board to obtain a comparison result when both the first check result and the second check result indicate that the check succeeds;
   determining the first board as the active board and the second board as the standby board when the comparison result indicates that data stored on the first board is latest data; and
   determining the second board as the active board and the first board as the standby board when the comparison result indicates that data stored on the second board is the latest data.

3. The method of claim 1, wherein determining the active board and the standby board comprises:

outputting the first check result and the second check result when the first check result and the second check result are different;
receiving a selection instruction input for the first board and the second board according to the first check result and the second check result; and
determining a selected board as the active board and an unselected board as the standby board.

4. The method of claim 1, wherein determining the active board and the standby board comprises:
comparing first to-be-compared information in the first active area of the first board with second to-be-compared information in the second active area of the second board to obtain a comparison result when the first check result and the second check result are consistent;
outputting the comparison result when the comparison result indicates that the first to-be-compared information and the second to-be-compared information are different;
receiving a selection instruction input for the first board and the second board according to the comparison result; and
determining a selected board as the active board and an unselected board as the standby board.

5. The method of claim 1, further comprising changing the standby area of the standby board to an active area and an active area of the standby board to a standby area when the data in the active area of the active board is synchronized successfully.

6. The method of claim 1, further comprising outputting, on the board whose data is damaged, alarm information for prompting that the data is damaged when data on one of the first board or the second board is damaged.

7. The method of claim 1, wherein for either of the first board and the second board, the data stored in the active area of the board is independent of the data stored in the standby area of the board.

8. An out-of-band management device, wherein the out-of-band management device comprises a first board and a second board, and wherein the out-of-band management device is configured to:
check, before data synchronization, first to-be-checked information stored in a first active area of the first board to obtain a first check result, wherein the first board comprises the first active area and a first standby area, and wherein the first active area stores more recent data than the first standby area;
check, before data synchronization, second to-be-checked information stored in a second active area of the second board to obtain a second check result, wherein the second board comprises the second active area and a second standby area, and wherein the second active area stores more recent data than the second standby area;
determine an active board and a standby board from the first board and the second board according to the first check result and the second check result; and
synchronize data in an active area of the active board to a standby area of the standby board, wherein the data in the active area of the active board comprises valid data.

9. The out-of-band management device of claim 8, wherein the out-of-band management device is configured to:
determine the first board as the active board and the second board as the standby board when the first check result indicates that the first to-be-checked information is checked successfully and the second check result indicates that the second to-be-checked information fails to be checked;
determine the second board as the active board and the first board as the standby board when the first check result indicates that the first to-be-checked information fails to be checked and the second check result indicates that the second to-be-checked information is checked successfully;
comparing first to-be-compared information in the first active area of the first board with second to-be-compared information in the second active area of the second board to obtain a comparison result when both the first check result and the second check result indicate that the check succeeds;
determine the first board as the active board and the second board as the standby board when the comparison result indicates that data stored on the first board is latest data; and
determine the second board as the active board and the first board as the standby board when the comparison result indicates that data stored on the second board is the latest data.

10. The out-of-band management device of claim 8, wherein the out-of-band management device is configured to:
output the first check result and the second check result when the first check result and the second check result are different;
receive a selection instruction input for the first board and the second board according to the first check result and the second check result; and
determine a selected board as the active board and an unselected board as the standby board.

11. The out-of-band management device of claim 8, wherein the out-of-band management device is configured to:
compare first to-be-compared information in the first active area of the first board with second to-be-compared information in the second active area of the second board to obtain a comparison result when the first check result and the second check result are consistent;
output the comparison result when the comparison result indicates that the first to-be-compared information and the second to-be-compared information are different;
receive a selection instruction input for the first board and the second board according to the comparison result; and
determine a selected board as the active board and an unselected board as the standby board.

12. The out-of-band management device of claim 8, wherein the out-of-band management device is configured to change the standby area of the standby board to an active area and an active area of the standby board to a standby area when the data in the active area of the active board is synchronized successfully.

13. The out-of-band management device of claim 8, wherein the out-of-band management device is configured to output, on a board whose data is damaged, alarm information for prompting that the data is damaged when data on one of the first board or the second board is damaged.

14. The out-of-band management device of claim 8, wherein for either of the first board and the second board, the data stored in the active area of the board is independent of the data stored in the standby area of the board.

15. A computer program product, comprising a non-transitory computer-readable storage medium storing computer executable instructions, that when executed by one or more processors, perform the operations of:

checking, before data synchronization, first to-be-checked information stored in a first active area of a first board in an out-of-band management device to obtain a first check result, wherein the first board comprises the first active area and a first standby area, and wherein the first active area stores more recent data than the first standby area;

checking before data synchronization, second to-be-checked information stored in a second active area of a second board in the out-of-band management device to obtain a second check result, wherein the second board comprises the second active area and a second standby area, and wherein the second active area stores more recent data than the second standby area;

determining an active board and a standby board from the first board and the second board according to the first check result and the second check result; and synchronizing data in an active area of the active board to a standby area of the standby board, wherein the data in the active area of the active board is valid data.

16. The computer program product of claim 15, wherein the operations further comprise:

determining the first board as the active board and the second board as the standby board when the first check result indicates that the first to-be-checked information is checked successfully and the second check result indicates that the second to-be-checked information fails to be checked;

determining the second board as the active board and the first board as the standby board when the first check result indicates that the first to-be-checked information fails to be checked and the second check result indicates that the second to-be-checked information is checked successfully;

comparing first to-be-compared information in the first active area of the first board with second to-be-compared information in the second active area of the second board to obtain a comparison result when both the first check result and the second check result indicate that the check succeeds;

determining the first board as the active board and the second board as the standby board when the comparison result indicates that data stored on the first board is latest data; and determining the second board as the active board and the first board as the standby board when the comparison result indicates that data stored on the second board is the latest data.

17. The computer program product of claim 15, wherein the operations further comprise:

outputting the first check result and the second check result when the first check result and the second check result are different, receiving a selection instruction input for the first board and the second board according to the first check result and the second check result, and determining a selected board as the active board and an unselected board as the standby board; and comparing first to-be-compared information in the first active area of the first board with second to-be-compared information in the second active area of the second board to obtain a comparison result when the first check result and the second check result are consistent, outputting the comparison result when the comparison result indicates that the first to-be-compared information and the second to-be-compared information are different, receiving a selection instruction input for the first board and the second board according to the comparison result, and determining the selected board as the active board and the unselected board as the standby board.

18. The computer program product of claim 15, wherein the operations further comprise changing the standby area of the standby board to an active area and an active area of the standby board to a standby area when the data in the active area of the active board is synchronized successfully.

19. The computer program product of claim 15, wherein the operations further comprise outputting, on a board whose data is damaged, alarm information for prompting that the data is damaged when data on one of the first board or the second board is damaged.

20. The computer program product of claim 15, wherein for either of the first board and the second board, the data stored in the active area of the board is independent of the data stored in the standby area of the board.

* * * * *